March 24, 1925.  1,530,892
H. HARFORD
TIRE CHAIN
Filed April 30, 1923
Fig. 1.
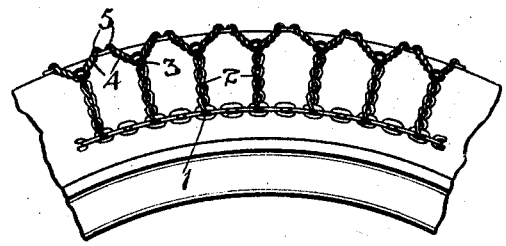
Fig. 3.
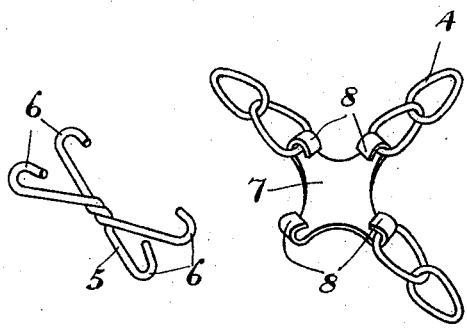
Fig. 4.
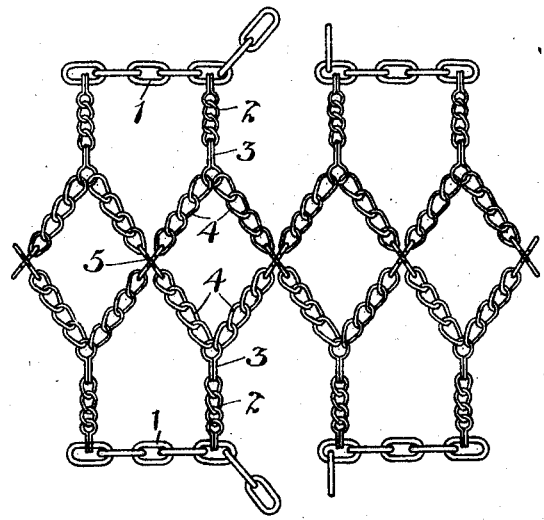
Fig. 2.
Inventor
Harry Harford
by H. S. Dennison
Atty Patented Mar. 24, 1925.

1,530,892

UNITED STATES PATENT OFFICE.

HARRY HARFORD, OF LEWISTON, IDAHO.

TIRE CHAIN.

Application filed April 30, 1923. Serial No. 635,639.

*To all whom it may concern:*

Be it known that I, HARRY HARFORD, a citizen of the United States of America, and resident of Lewiston, in the State of Idaho, in the United States of America, have invented certain new and useful Improvements in Automobile Tire Chains, as described in the following specification and illustrated in the accompanying drawings, that form part of the same.

The principal objects of the invention are to greatly increase the traction of tire chains and to facilitate the attaching and detaching of same.

The principal feature of the invention consists in the novel construction of the chain band whereby diagonally disposed chain members are continuously presented to the road surface as the wheel revolves, the arrangement constituting a succession of crossed chain structures having their outward ends connected to the side circumferential chains by short single chain lengths connecting the ends of the adjacent portions of crosses.

In the drawings, Figure 1 is a side elevational view of a portion of a wheel showing my improved chain attached thereto.

Figure 2 is an enlarged plan view of a section of the chain showing the side bands open.

Figure 3 is an enlarged perspective detail showing one form of central connecting member for the crosses.

Figure 4 is a perspective detail of another form of a central connection for the crosses.

The most common form of traction chain for motor cars is that which is formed of side chains and transverse chains connecting the side chains. Other forms have been devised arranging the cross bars diagonally but these do not produce a sufficiently reliable traction effect.

In the construction herein shown, the circular side chains 1 have connected thereto at intervals the short chain lengths 2, the inner ends of which are provided with hooked loops 3 and to these loops are connected the ends of the chain lengths 4 which are connected together centrally in the form of a cross. Various forms of central connecting members 5 may be devised. One of these is shown in detail in Figure 3 as being formed of two lengths of steel wire twisted together at the centre and forming a plurality of hooks 6 which hook into the chain sections 4.

Another form is shown in Figure 4 in which the connecting member is in the form of a metal plate 7 having hooks 8 to engage the chain lengths 4.

The crossed chains are of sufficient length to cover the tread surface of the tire and the distance from centre to centre of the crosses is such that there will always be a considerable surface of traction chain in contact with the ground, consequently the chain will be freed from the terrific tearing effect of the sudden shock of catching upon the ground with the wheel revolving at a high rate of speed and slipping in the manner that occurs with the forms of chain at present in use.

Further, this form of chain can be made to fit the tire very snugly and as the crosses can swing upon their central connections, the chain will enlarge sufficient to slip over the tire without having disconnected ends. In fact, it is only necessary to open one of the side chains 1 in order to slip a chain on to a wheel. This will very greatly simplify the matter of placing the chains.

A further important feature in connection with a chain constructed as described is that the central cross portions may be renewed without the necessity of renewing the entire connection between the side chains, that is to say, only the portion that is worn need be discarded. The centre links when worn can be readily disconnected from the hook members 3 and replaced by new sections.

A chain such as described effectively eliminates the slipping of the wheels upon ice or snow and produces extraordinary traction effect in mud where a continuous gripping contact of the road surface is most important.

What I claim as my invention is:—

An automobile tire chain, comprising, a pair of circumferential chains, short chain lengths arranged at intervals around said circumferential chains and having loops hooked into the inner ends thereof, a pair of short chain lengths connected to each of said loops, and cross connecting members each having four hooks joining the ends of said latter chain lengths in crosses.

HARRY HARFORD.